(12) United States Patent
Gerardiere et al.

(10) Patent No.: US 10,317,249 B2
(45) Date of Patent: Jun. 11, 2019

(54) METHOD FOR DETERMINING THE POSITION OF A MOVING PART ALONG AN AXIS, USING AN INDUCTIVE SENSOR

(71) Applicants: CONTINENTAL AUTOMOTIVE FRANCE, Toulouse (FR); CONTINENTAL AUTOMOTIVE GmbH, Hannover (DE)

(72) Inventors: Olivier Gerardiere, Tournefeuille (FR); Jeremie Blanc, Balma (FR); Jean-Louis Roux, Brax (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 173 days.

(21) Appl. No.: 15/165,101

(22) Filed: May 26, 2016

(65) Prior Publication Data

US 2016/0349084 A1    Dec. 1, 2016

(30) Foreign Application Priority Data

May 27, 2015 (FR) ...................................... 15 54773

(51) Int. Cl.
*G01D 5/20* (2006.01)
*G01D 5/22* (2006.01)
*G01D 5/244* (2006.01)

(52) U.S. Cl.
CPC ........... *G01D 5/204* (2013.01); *G01D 5/2448* (2013.01); *G01D 5/22* (2013.01)

(58) Field of Classification Search
None
See application file for complete search history.

(56) References Cited

U.S. PATENT DOCUMENTS

| 2002/0043972 A1* | 4/2002 | Irle ........................ G01D 5/204 324/207.17 |
| 2007/0194781 A1* | 8/2007 | Zhitomirskiy ......... G01D 5/204 324/207.17 |

(Continued)

FOREIGN PATENT DOCUMENTS

| CN | 102648399 | 8/2012 |
| CN | 102686979 | 9/2012 |
| CN | 103201504 | 7/2013 |
| CN | 103217179 | 7/2013 |

(Continued)

OTHER PUBLICATIONS

Benammar et al., "A Novel Resolver-to-360 Linearized Converter" IEEE Sensors Journal, vol. 4, No. 1, Feb. 2004.*

(Continued)

*Primary Examiner* — John C Kuan
(74) *Attorney, Agent, or Firm* — Young & Thompson

(57) ABSTRACT

A method for determining the position $\theta$ of a moving part (T) along an axis (X), using an inductive sensor (10) including: a primary winding (B1) generating an electromagnetic field; a first secondary winding (R1), generating a first voltage signal (V1), of the sine function type; a second secondary winding (R2), generating a second voltage signal (V2) of the cosine function type; and a calculation unit (20'), wherein the method includes the steps of calculating and distributing linearization points i on the arctangent function tan($\theta$) resulting from the ratio of the first voltage signal to the second voltage signal, the linearization points i being distributed according to a sinusoidal function in order to reduce the error on the position ($\theta$) of the target (T) at the ends (E1, E2) of the primary and secondary windings (R1, R2).

4 Claims, 4 Drawing Sheets

(56) References Cited

U.S. PATENT DOCUMENTS

| | | |
|---|---|---|
| 2011/0181302 A1 | 7/2011 | Shao et al. |
| 2012/0098527 A1* | 4/2012 | Ely .................. G01D 5/208 324/207.15 |
| 2012/0223701 A1* | 9/2012 | Vaysse ............... G01D 5/204 324/207.16 |
| 2013/0024156 A1 | 1/2013 | Servel |
| 2013/0268234 A1 | 10/2013 | Janisch |
| 2013/0297252 A1 | 11/2013 | Baissac |
| 2014/0125327 A1* | 5/2014 | Lackey .............. G01B 7/14 324/207.17 |
| 2014/0167788 A1 | 6/2014 | Fontanet |
| 2014/0225600 A1* | 8/2014 | Fontanet ........... G01D 5/2053 324/207.15 |
| 2015/0247746 A1 | 9/2015 | Schindler |

FOREIGN PATENT DOCUMENTS

| | | |
|---|---|---|
| CN | 103868450 | 6/2014 |
| EP | 0 094 286 A2 | 11/1983 |
| JP | 2013-518247 | 5/2013 |
| WO | 2014/075698 A1 | 5/2014 |

OTHER PUBLICATIONS

Rahal et al., "An ASIC Front End for Planar High-Frequency Contactless Inductive Position Sensors" IEEE Transactions on Instrumentation and Measurement, vol. 58, No. 9, Sep. 2009.*

FR Search Report, dated Jan. 21, 2016, from corresponding FR application.

Benammar, M. et al., "A Novel Resolver-to-360° Linearized Converter," IEEE Sensors Journal, vol. 4, No. 1, Feb. 2004, pp. 96-101.

* cited by examiner

METHOD FOR DETERMINING THE POSITION OF A MOVING PART ALONG AN AXIS, USING AN INDUCTIVE SENSOR

FIELD OF THE INVENTION

The present invention relates to a method for determining the position of a target along an axis, using an inductive position sensor.

BACKGROUND OF THE INVENTION

This type of sensor has the advantage of allowing the position of a mechanical part, or any other element, to be determined without the need for contact with the part whose position it is desired to know. Because of this advantage, there are numerous applications of these sensors in all types of industry. These sensors are also used in consumer applications, for example in the motor vehicle field, in which the present invention was devised. However, the invention may be used in a variety of other different fields.

The operating principle of an inductive sensor is based on the variation of coupling between a primary winding and secondary windings of a transformer operating at high frequency, without the use of a magnetic circuit. The coupling between these windings varies as a function of the position of a moving (electrically) conductive part, usually called a "target". Currents induced in the target have the effect of modifying the currents induced in the secondary windings. By adapting the configuration of the windings, and given a knowledge of the current injected into the primary winding, the measurement of the current induced in the secondary windings can be used to determine the position of the target.

SUMMARY OF THE INVENTION

For the purpose of incorporating an inductive sensor of this type into a device, notably an electronic device, there is a known way of forming the aforementioned transformer on a printed circuit card. The primary winding and the secondary windings are then created by tracks formed on the printed circuit card. The primary winding is then, for example, powered by an external source, and the secondary windings then carry currents induced by the magnetic field created by the flow of a current in the primary winding. The target, which is a conductive part, for example a metal part, may have a simple shape. It may, for example, be a part cut out of a sheet. To produce a linear sensor, the cut-out for forming the target is, for example, rectangular, whereas for a rotary sensor this cut-out is, for example, in the shape of an angular sector with a radius and angle adapted to the movement of the part.

FIG. 3 shows the inductive sensor 10, comprising, among other components, an energizing primary winding B1 and two receiving secondary windings R1, R2.

The target T moves along the inductive sensor, along an axis X, modifying the currents (eddy currents) in the secondary windings R1, R2 which are induced by the electromagnetic flux generated by the primary winding B1.

Generally, two sets of secondary windings R1, R2 are provided, to form sine and cosine functions, respectively, of the position of the target T over a complete travel of the inductive sensor 10.

The first and second secondary windings R1, R2 generate a first voltage signal V1 and a second voltage signal V2 of sine and cosine form (see FIG. 1) at their terminals, as a function of a spatial angle θ, representing the position of the target T along the axis X.

These functions (cosine and sine) are well-known and can easily be processed by a control unit 20 incorporated into an electronic system, represented schematically in FIG. 3. By finding the ratio of the sine to the cosine and then applying an arctangent function, an image of the position of the target T along the axis X is obtained (see FIG. 2).

This is shown in FIG. 2, which represents the arctangent function "tan" as a function of the position P of the target T. The argument of the sine and cosine functions is a linear (or affine) function of the position of the target T whose travel then represents a larger or smaller part of the spatial period of these trigonometric functions.

As shown in FIG. 2, the resulting arctangent function is not strictly linear.

For the purpose of establishing a direct relation between the arctangent function and the position of the target T along the axis, in terms of the spatial angle θ for example, there is a method of linearizing the arctangent function which is known from the prior art.

For this purpose, a linear regression y=ax+b, that is to say y=a×θ+b, a and b being two constants, is applied to the arctangent function. Said linear regression is applied to consecutive segments of values of said function, spaced apart at identical spatial angle intervals Δθ and equidistant (see FIG. 2). This linear regression is known to those skilled in the art.

For each segment Δθ, the linear interpolation y=a×θ+b is applied. This is known to those skilled in the art.

This results in a straight linear regression line $D_L$, enabling the position θ of the target T to be known directly for each value of the arctangent function.

However, the linearization of the arctangent function creates imprecision at the ends E1, E2 of the travel C of the target (see FIG. 2), where there are significant edge effects. This imperfect linearity affects the precision of the position P of the target T at these ends E1, E2.

As shown in FIG. 1, at each end E1, E2, there is a considerable difference Δ1, Δ2 between the actual position θ of the target T and that indicated by the straight line $D_L$.

This imprecision at the ends E1, E2 reduces the useful travel $C_u$ of the target T to about 60% of the length L of the two secondary coils R1, R2 (see FIG. 2).

The invention proposes to overcome this problem, and proposes a method for determining the position of a target T along an axis using an inductive position sensor, whereby the imprecision in the position of the target T at the ends E1, E2 of the travel $C_u$ of said target T can be reduced, and the useful travel $C_u$ of the target can therefore be extended by comparison with the prior art.

The invention proposes a method for determining the position of a moving part, called a "target", along an axis, using an inductive sensor, said inductive sensor comprising:
 a primary winding generating an electromagnetic field,
 a first secondary winding, generating a first voltage signal, of the sine function type, representing the current induced in said first secondary winding when the target moves in front of the first secondary winding,
 a second secondary winding, generating a second voltage signal, of the cosine function type, representing the current induced in said second secondary winding when the target moves in front of the second secondary winding,
 a calculation unit, said method of determination according to the invention comprising the following steps:

Step 1: calculating an arctangent function on the basis of the first voltage signal and the second voltage signal, Step 2: calculating an error between the arctangent function calculated in this way and a predetermined straight line, Step 3: calculating the positions of linearization points of the arctangent function according to the formula $$\theta_i = (i-1) \times \frac{c_u}{(n-1)} - \left[\sin\left(\frac{(i-1) \times 2 \times \pi}{(n-1)}\right) \times F \times C_u\right]$$

where:

i is the index of the linearization points, varying from 1 to n, $\theta_i$ is the position of the linearization point i as a spatial angle, F is the spacing factor of the linearization points, where F>0 and $F_{MAX}$ is such that:

$$F_{MAX} < (i-1) \times \frac{c_u}{(n-1)} - \left[\sin\left(\frac{(i-1) \times 2 \times \pi}{(n-1)}\right) \times C_u\right]$$

$C_u$ is the useful travel of the sensor along the axis as a spatial angle.

Step 4: for each value of the arctangent function, finding an index i of the linearization point such that:

$\theta_i < \theta < \theta_{i+1}$ where:

$\theta_i$ is the position of the linearization point i as a spatial angle, $\theta_{i+1}$ is the position of the linearization point (i+1) as a spatial angle, $\theta$ is a spatial angle.

Step 5: calculating a correction to be applied to the arctangent function according to the formula $$\text{Corr}(\tan(\theta)) = \varepsilon(\theta_i) + [\varepsilon(\theta_{i+1}) - \varepsilon(\theta_i)] \times \left[\frac{\tan(\theta) - \tan(\theta_i)}{\tan(\theta_{i+1}) - \tan(\theta_i)}\right]$$

where:

Corr(tan($\theta$)) is the correction on the arctangent function at the spatial angle $\theta$, $\varepsilon(\theta_i)$ is the error at the spatial angle $\theta_i$, $\varepsilon(\theta_{i+1})$ is the error at the spatial angle $\theta_{i+1}$, tan($\theta_i$) is the value of the arctangent function at the spatial angle $\theta_i$, tan($\theta_{i+1}$) is the value of the arctangent function at the spatial angle $\theta_{i+1}$, tan($\theta$) is the value of the arctangent function at the spatial angle $\theta$.

Step 6: calculating a corrected arctangent function:

$\tan_{corr}(\theta) = \tan(\theta) + \text{Corr}(\tan(\theta))$ where:

$\tan_{corr}(\theta)$ is the corrected arctangent function, tan($\theta$) is the arctangent function, Corr(tan($\theta$)) is the correction on the arctangent function at the spatial angle $\theta$.

Step 7: determining the position of the target along the axis on the basis of the arctangent function corrected in this way.

Preferably, in step 2 the predetermined straight line is a linear regression of the arctangent function.

The invention also relates to an inductive sensor for sensing the position of a target along an axis, comprising:

a primary winding generating an electromagnetic field, a first secondary winding, generating a first voltage signal, of the sine function type, representing the current induced in said first secondary winding when the target moves in front of the first secondary winding, a second secondary winding, generating a second voltage signal, of the cosine function type, representing the current induced in said second secondary winding when the target moves in front of the second secondary winding, a calculation unit, according to the invention, the calculation unit comprises:

first means for calculating the arctangent function on the basis of the first voltage signal and the second voltage signal, second means for calculating an error between the arctangent function calculated in this way and a predetermined straight line, third means for calculating the positions of linearization points of the arctangent function (according to the formula $$\theta_i = (i-1) \times \frac{c_u}{(n-1)} - \left[\sin\left(\frac{(i-1) \times 2 \times \pi}{(n-1)}\right) \times F \times C_u\right]$$

where:

i is the index of the linearization point, varying from 1 to n, $\theta_i$ is the position of the linearization point i as a spatial angle, F is the spacing factor of the linearization points, where F>0 and $F_{MAX}$ is such that:

$$F_{MAX} < (i-1) \times \frac{c_u}{(n-1)} - \left[\sin\left(\frac{(i-1) \times 2 \times \pi}{(n-1)}\right) \times C_u\right]$$

$C_u$ is the useful travel of the sensor along the axis as a spatial angle.

means for finding an index i of the linearization point such that, for each value of the arctangent function:

$\theta_i < \theta < \theta_{i+1}$ where:

$\theta_i$ is the position of the linearization point i as a spatial angle, $\theta_{i+1}$ is the position of the linearization point (i+1) as a spatial angle, $\theta$ is a spatial angle.

fourth means for calculating the correction to be applied to the arctangent function according to the formula $$\text{Corr}(\tan(\theta)) = \varepsilon(i) + [\varepsilon(i+1) - \varepsilon(i)] \times \left[\frac{\tan(\theta) - \tan(i)}{\tan(i+1) - \tan(i)}\right]$$

where:
Corr(tan(θ)) is the correction on the arctangent function at the spatial angle θ,
ε(i) is the error at the linearization point i,
ε(i+1) is the error at the linearization point (i+1),
tan(i) is the value of the arctangent function at the point i,
tan(i+1) is the value of the arctangent function at the point (i+1),
tan(θ) is the value of the arctangent function at the spatial angle θ.
fifth means for calculating the corrected arctangent function:

$$\tan_{corr}(\theta)=\tan(\theta)+\text{Corr}(\tan(\theta))$$

where:
$\tan_{corr}(\theta)$ is the corrected arctangent function,
tan(θ) is the arctangent function,
Corr(tan(θ)) is the correction on the arctangent function at the spatial angle θ.
means for determining the position of the target along the axis on the basis of the arctangent function corrected in this way.

BRIEF DESCRIPTION OF THE DRAWINGS

The invention is equally applicable to any motor vehicle comprising an inductive sensor according to the characteristics listed above.

Other characteristics and advantages of the invention will be evident from a reading of the following description and from an examination of the appended drawings, in which.

DETAILED DESCRIPTION OF THE INVENTION

Figure 1:
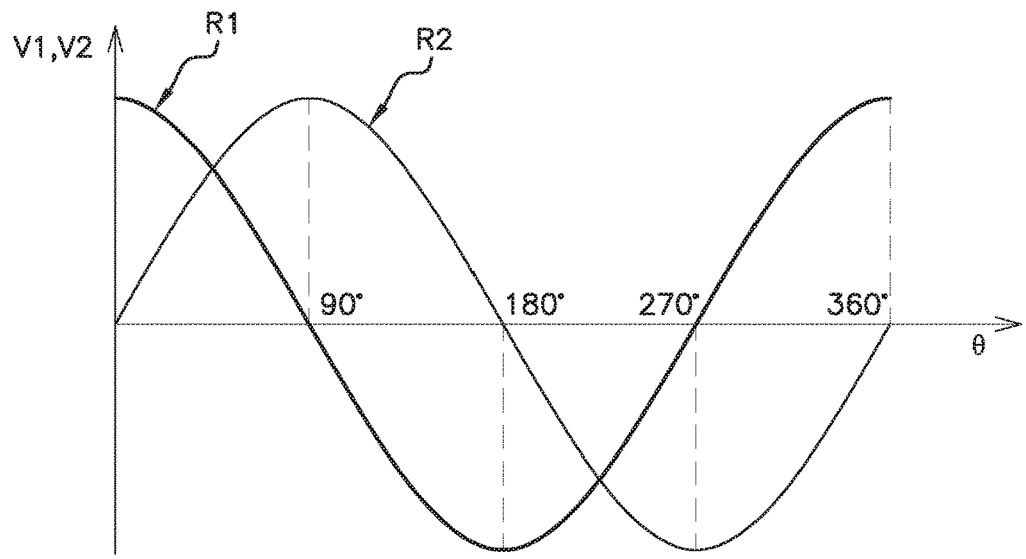
FIG. 1, explained above, shows, according to the spatial angle θ, the first voltage signal V1 and the second voltage signal V2 at the terminals of the first secondary winding R1 and the second secondary winding R2 respectively, FIG. 2, explained above, shows the arctangent function according to the position P of the target T along the axis X, FIG. 3, explained above, shows the inductive sensor 10 according to the prior art.
Figure 2:
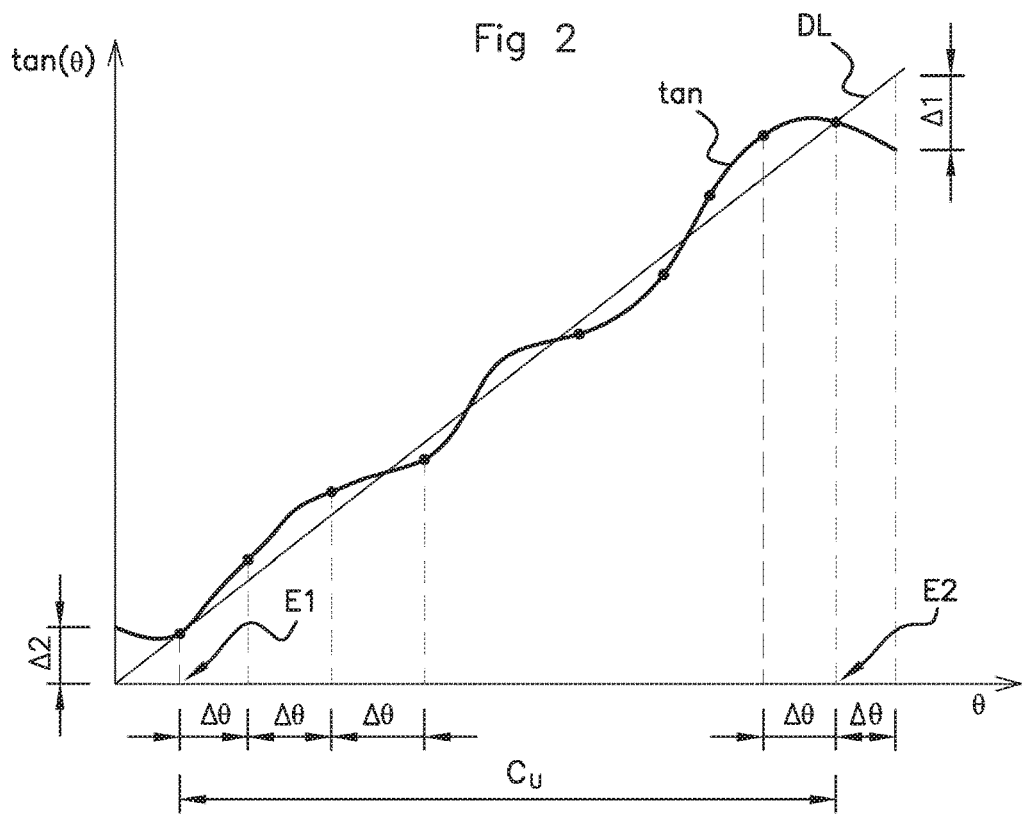
Figure 3:
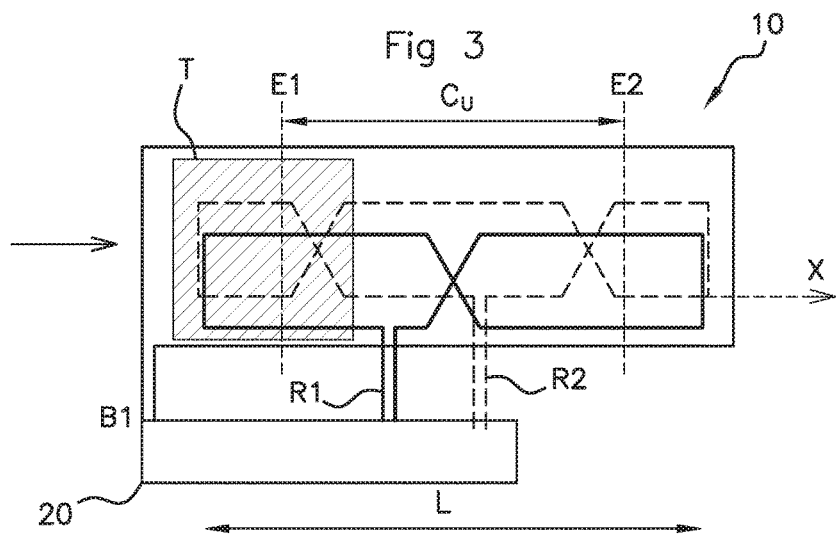

As shown in FIG. 2, and explained above, the inductive position sensor 10 for measuring the position of a target T moving along an axis X comprises:
a primary winding B1 generating an electromagnetic field,
a first secondary winding R1, generating a first voltage signal V1 as a function of a spatial angle θ (see FIG. 1), of the sine function type, representing the current induced in said first secondary winding R1 when the target T moves in front of the first secondary winding, along the axis X,
a second secondary winding R2, generating a second voltage signal V2 as a function of a spatial angle θ (see FIG. 1), of the cosine function type, representing the current induced in said second secondary winding R2 when the target T moves in front of the second secondary winding, along the axis X,
a calculation unit 20, which supplies a voltage to the primary winding B1, and which measures the first voltage signal V1 and the second voltage signal V2, at the terminals of the first secondary winding R1 and at the terminals of the second secondary winding R2 respectively, in order to deduce therefrom the position of the target T along the axis X.

For clarity, the position of the target T along the axis X will be expressed here as a spatial angle θ. It should be noted that the invention can be applied in a similar manner to determine the position of the target T along the axis X, expressed as a distance x (in cm or mm).

According to the prior art, for the purpose of determining the position of the target T along the axis X, there is a known way of calculating the arctangent of the ratio between the sine and the cosine, that is to say between the first voltage signal V1 and the second voltage signal V2, as follows:

$$\tan(\theta) = \left(\frac{\sin\theta}{\cos\theta}\right) = \left(\frac{V1}{V2}\right),$$

and then linearizing the arctangent function found in this way, by applying a linear regression of the y=a×θ+b type to segments of values of said function, spaced apart from one another by an identical and equidistant spatial angle of Δθ (see FIG. 2).

However, this prior art method of determining the position T cannot be used for the precise determination of the position of the target T at the ends E1, E2 of the total travel of the target T, that is to say at the ends E1, E2 of the secondary coils R1, R2.

This drawback has the effect of reducing the useful travel $C_u$ of the target T.

To overcome this drawback, the invention proposes the following method of determining the position of the target T, explained below.

In a first step (step 1), the arctangent function tan(θ) is calculated, as in the prior art determination method, such that:

$$\tan(\theta) = \left(\frac{\sin\theta}{\cos\theta}\right) = \left(\frac{V1}{V2}\right)$$

where:
V1 is the first voltage signal, representing the sine function,
V2 is the second voltage signal, representing the cosine function.

In a second step (step 2), according to the invention, an error ε(θ) between the arctangent function tan(θ) and a predetermined straight line $D_L$ (see FIG. 4) is calculated.

$$\varepsilon(\theta)=\tan(\theta)-D_t$$

In a preferred embodiment, said straight line $D_L$ is the linear regression of the arctangent function, having the equation $y_{DL}$=y=a×θ+b (see FIG. 2), and therefore:

$$\varepsilon(\theta)=\tan(\theta)-y_{DL}$$

Figure 4:
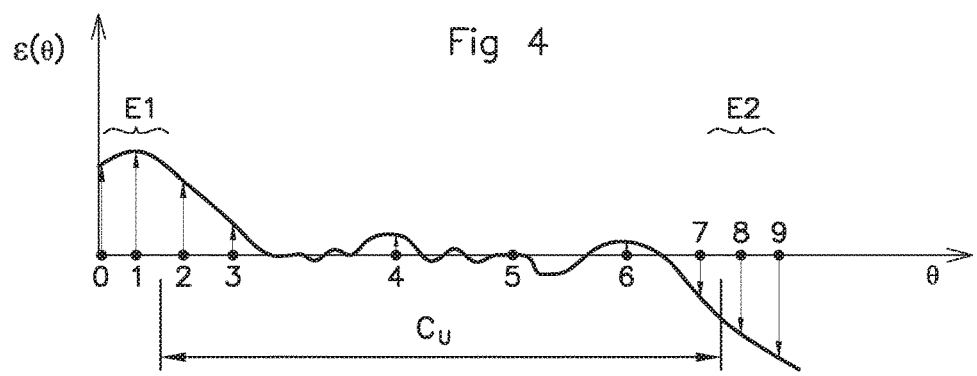
FIG. 4 shows schematically the error on the arctangent function relative to the straight linear regression line $D_L$, as a function of the spatial angle θ.

Said error ε(θ) is shown in FIG. 4, and is greater at the ends E1, E2 of the travel of the target T.

In a third step (step 3), the position of the linearization points i (that is to say, the linear regression points) of the arctangent function tan(θ), according to the spatial angle θ, are calculated according to the equation:

$$\theta_i = (i-1) \times \frac{C_u}{(n-1)} - \left[\sin\left(\frac{(i-1) \times 2 \times \pi}{(n-1)}\right) \times F \times C_u\right] \quad [1]$$

where:
θ$_i$ is the position of the linearization point i as a spatial angle θ,
i is the index of the linearization point, varying from 1 to n; in this example, n is in the range from 5 to 101. It should be noted that n may be greater than 101. F is the spacing factor of the linearization points i, where F>0 and $F_{MAX}$ is such that:

$$F_{MAX} < (i-1) \times \frac{C_u}{(n-1)} - \left[\sin\left(\frac{(i-1) \times 2 \times \pi}{(n-1)}\right) \times C_u\right]$$

$C_u$ is the useful travel of the sensor 10 along the axis X as a spatial angle θ in the range from 0° to 360°.
π: is a constant equal to 3.14.

The essence of the invention lies in the use of a sinusoidal function to distribute the linear regression points i over the arctangent function tan(θ). By distributing the linear regression points i according to the sinusoidal function, the number of linearization points i can be made more dense at the ends E1, E2 of the arctangent function, where the error ε(θ) is greatest (see FIG. 4).

It should be noted that the invention may be implemented by using the arctangent function in place of the sine function in equation [1].

FIG. 4 shows 9 linear regression points i; that is to say, n=9. The first three linearization points 0, 1, 2 are located at the end E1, and the last three linearization points 7, 8, 9 are located at the end E2.

The distribution of points 0, 1, 2, 7, 8, 9 at the ends E1, E2 is denser than that of points 4, 5, 6 on the rest of the useful travel $C_u$ of the target T.

In a fourth step (step 4), for each value of the arctangent function tan(θ), the window of linear regression points i containing the abscissa θ of said value is determined. More precisely, for each value tan(θ), the index i of the linearization point is determined, such that:

$$\theta_i < \theta < \theta_{i+1}$$

where:
θ$_i$ is the position of the linearization point i as a spatial angle,
θ$_{i+1}$ is the position of the linearization point (i+1) as a spatial angle,
θ is a spatial angle.

Figure 5:
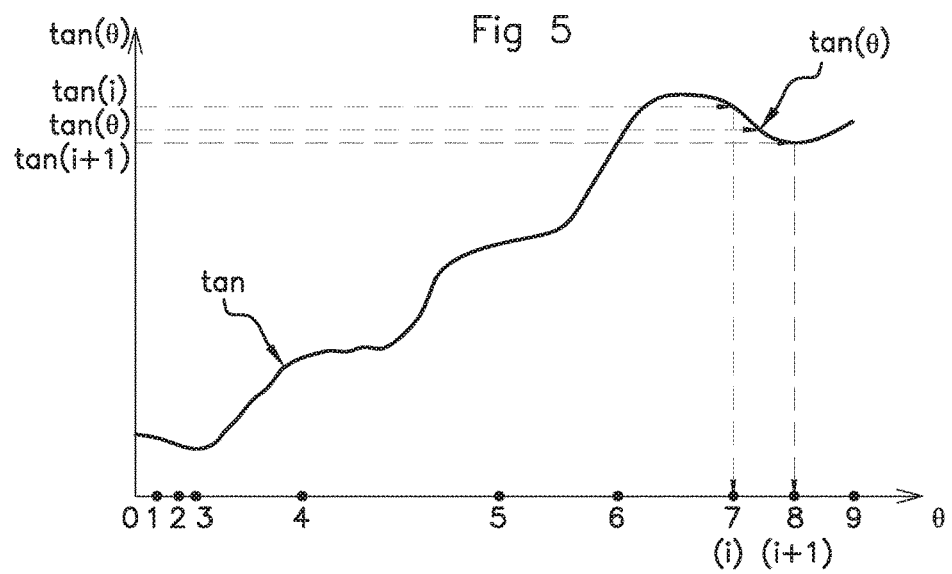
FIG. 5 shows schematically the distribution of the linearization points i according to the invention as a function of the spatial angle θ.

An example is shown in FIG. 5. In this example, the value tan(θ) corresponds to a spatial angle θ included in the window of the linear regression points i=7 and (i+1)=8.

In step 5, the correction to be applied to the arctangent function tan(θ) is calculated according to the following formula:

$$\text{Corr}(\tan(\theta)) = \varepsilon(i) + [\varepsilon(\theta_{i+1}) - \varepsilon(\theta_i)] \times \left[\frac{\tan(\theta) - \tan(\theta_i)}{\tan(\theta_{i+1}) - \tan(\theta_i)}\right]$$

where:
Corr(tan(θ)) is the correction on the arctangent function at the spatial angle θ,
ε(θ$_i$) is the error at the spatial angle θ$_i$,
ε(θ$_{i+1}$) is the error at the spatial angle θ$_{i+1}$,
tan(θ$_i$) is the value of the arctangent function at the spatial angle θ$_i$,
tan(θ$_{i+1}$) is the value of the arctangent function at the spatial angle θ$_{i+1}$,
tan(θ) is the value of the arctangent function at the spatial angle θ.

Then, in the sixth step (step 6), the correction calculated in this way is applied to the arctangent function tan(θ)

$$\tan_{corr}(\theta) = \tan(\theta) + \text{Corr}(\tan(\theta))$$

where:
$\tan_{corr}(\theta)$ is the corrected arctangent function,
tan(θ) is the arctangent function,
Corr(tan(θ)) is the correction on the arctangent function at the spatial angle θ.

Figure 6:
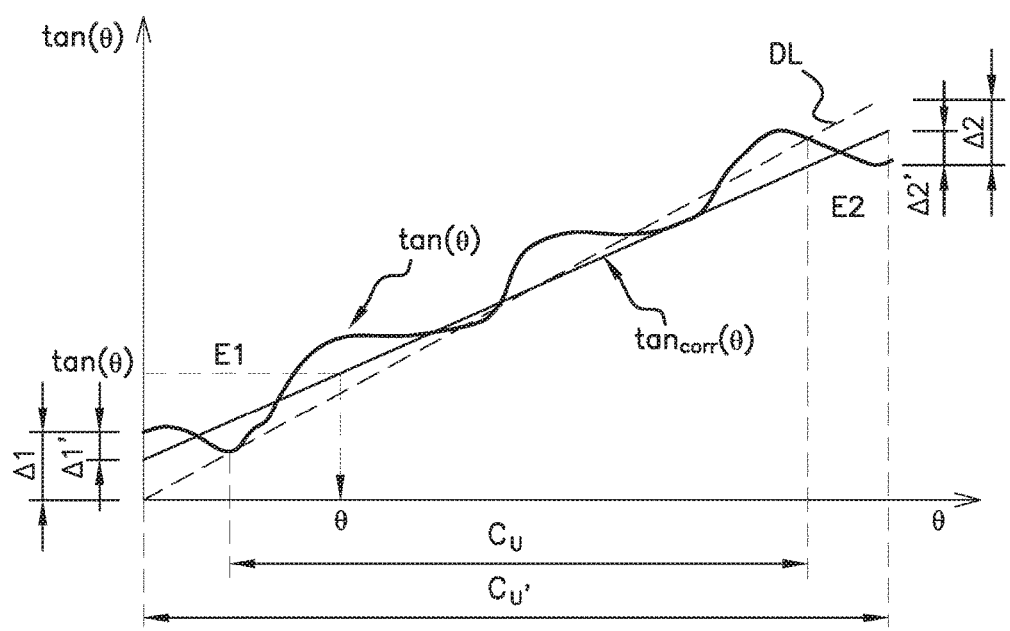
FIG. 6 shows the corrected arctangent function according to the invention.

This is shown in FIG. 6; the arctangent function corrected in this way $\tan_{corr}(\theta)$ is a straight line, different from the straight linear regression line $D_L$ of the prior art. Said corrected arctangent function has errors Δ1' and Δ2' at its ends E1, E2 between said corrected function $\tan_{corr}(\theta)$ and the arctangent function tan(θ) which are smaller than the errors Δ1 and Δ2 between the arctangent function tan(θ) and the straight linear regression line $D_L$ of the prior art.

Because of the precision provided by the determination method of the invention at the ends E1, E2, the useful travel $C_u$ of the target T is then considerably elongated. The new useful travel $C_u$, found by using the determination method according to the invention, is about 20% longer than the useful travel $C_u$ of the prior art. For example, with the linearization method according to the prior art, the useful travel Cu is equal to 40 mm, while, according to the method of the invention, the new useful travel Cu' is 48 mm.

Figure 7:
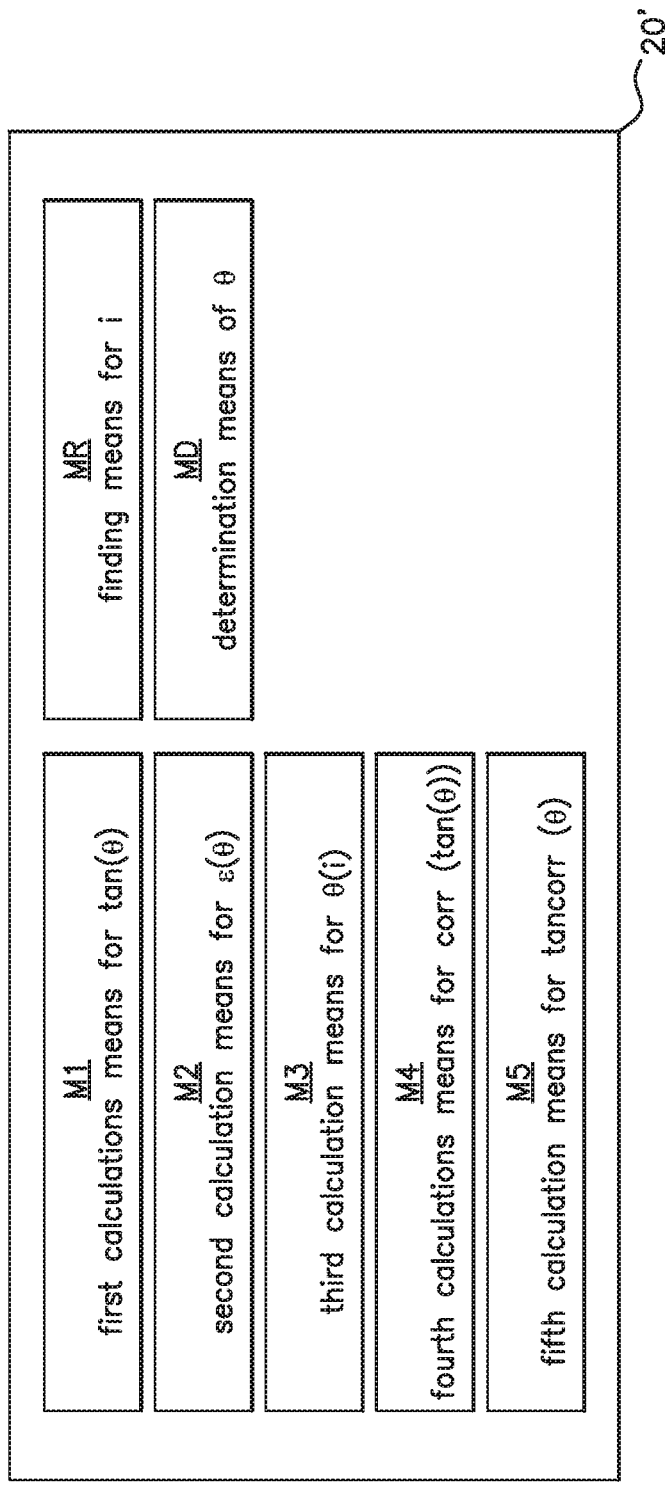
FIG. 7 shows schematically the calculation unit 20' according to the invention.

Steps 1 to 7 can be executed by means of software, using an electronic computer connected electrically to the inductive sensor 10, or alternatively by using a calculation unit 20' according to the invention (see FIG. 7).

The invention also relates to an inductive position sensor 10 comprising:
- a primary winding B1 generating an electromagnetic field,
- a first secondary winding R1, generating a first voltage signal V1, of the sine function type,
- a second secondary winding R2, generating a second voltage signal of the cosine function type,
- a calculation unit 20', According to the invention, the calculation unit 20' is adapted to execute steps 1 to 7 of the determination method detailed above.

For this purpose, the calculation unit 20' according to the invention comprises (see FIG. 7):
- first means (M1) for calculating the arctangent function tan(θ) on the basis of the first voltage signal V1 and the second voltage signal V2,
- second means (M2) for calculating an error ε(θ) between the arctangent function calculated in this way tan(θ) and a predetermined straight line $D_L$; in the preferred embodiment of the invention, the predetermined straight line $D_L$ is the straight linear regression line of said arctangent function tan(θ),
- third means (M3) for calculating the positions of linear regression points i of the arctangent function according to the formula:

$$\theta_i = (i-1) \times \frac{C_u}{(n-1)} - \left[\sin\left(\frac{(i-1) \times 2 \times \pi}{(n-1)}\right) \times F \times C_u\right]$$

where:

$\theta_i$ is the position of the linearization point i as a spatial angle θ, i is the index of the linearization point, varying from 1 to n; in this example, n is in the range from 5 to 101.

F is the spacing factor of the linearization points i, where F>0 and $F_{MAX}$ is such that:

$$F_{MAX} < (i-1) \times \frac{C_u}{(n-1)} - \left[\sin\left(\frac{(i-1) \times 2 \times \pi}{(n-1)}\right) \times C_u\right]$$

$C_u$ is the useful travel of the sensor 10 along the axis X as a spatial angle θ in the range from 0° to 360°.

π: is a constant equal to 3.14.

means ($M_R$) for finding the index i of the linearization point, for each value of the arctangent function, such that:

$$\theta_i < \theta < \theta_{i+1}$$

where:

$\theta_i$ is the position of the linearization point i as a spatial angle, $\theta_{i+1}$ is the position of the linearization point (i+1) as a spatial angle, θ is a spatial angle.

fourth means (M4) for calculating the correction to be applied to the arctangent function according to the formula:

$$\text{Corr}(\tan(\theta)) = \varepsilon(\theta_i) + [\varepsilon(\theta_{i+1}) - \varepsilon(\theta_i)] \times \left[\frac{\tan(\theta) - \tan(\theta_i)}{\tan(\theta_{i+1}) - \tan(\theta_i)}\right]$$

where:

Corr(tan(θ)) is the correction on the arctangent function at the spatial angle θ, $\varepsilon(\theta_i)$ is the error at the spatial angle $\varepsilon(\theta_{i+1})$ is the error at the spatial angle $\theta_{i+1}$, $\tan(\theta_i)$ is the value of the arctangent function at the spatial angle $\theta_1$, $\tan(\theta_{i+1})$ is the value of the arctangent function at the spatial angle $\theta_{i+1}$, tan(θ) is the value of the arctangent function at the spatial angle θ.

fifth means (M5) for calculating the corrected arctangent function:

$$\tan_{corr}(\theta) = \tan(\theta) + \text{Corr}(\tan(\theta))$$

where:

$\tan_{corr}(\theta)$ is the corrected arctangent function, tan(θ) is the arctangent function, Corr(tan(θ)) is the correction on the arctangent function at the spatial angle θ.

means ($M_D$) for determining the position θ of the target T along the axis X on the basis of the arctangent function corrected in this way $\tan_{corr}(\theta)$.

The first, second, third, fourth, and fifth calculation means, the search means and the determination means M1, M2, M3, M4, M5, $M_R$, $M_D$ take the form of software integrated into the calculation unit 20' (FIG. 7).

The essence of the invention lies in a judicious correction of the arctangent function, which is carried out by inexpensive software means.

The invention therefore enables the useful travel of an inductive position sensor to be considerably extended, while improving the precision of the position of the target at the ends of the travel.

The invention claimed is:

1. A method using an inductive sensor (10) for determining a position of a moving part, called a "target" (T), along an axis (X), where said inductive sensor (10) includes each of a primary winding (B1) generating an electromagnetic field, a first secondary winding (R1), generating a first voltage signal (V1) of a sine function type, representing a current induced in said first secondary winding (R1) when the target (T) moves in front of the first secondary winding (R1), a second secondary winding (R2), generating a second voltage signal (V2) of a cosine function type, representing a current induced in said second secondary winding (R2) when the target moves in front of the second secondary winding (R2), and a calculation unit (20') in communication with the first and second secondary windings (R1, R2), where the first and second secondary windings (R1, R2) generate said first and second voltage signals (V1, V2) as a function of a spatial angle, representing the position of the target (T) along the axis (X), said method, carried out by the calculation unit, comprising:

receiving the first voltage signal (V1) and the second voltage signal (V2) respectively from the first secondary winding (R1) and the second secondary winding (R2); and the steps of:

Step 1: calculating an arctangent function (tan(θ)) on the basis of the first voltage signal (V1) and the second voltage signal (V2);

Step 2: calculating an error (ε(θ)) between the calculated arctangent function (tan(θ)) and a predetermined straight line ($D_L$); and Step 3: calculating positions of linearization points ($\theta_i$) of the arctangent function (tan(θ)) according to the formula $$\theta_i = (i-1) \times \frac{C_u}{(n-1)} - \left[\sin\left(\frac{(i-1) \times 2 \times \pi}{(n-1)}\right) \times F \times C_u\right]$$

where:

i is an index of the linearization points, varying from 1 to n, ($\theta_i$) is the position of the linearization point i as a spatial angle, F is a spacing factor of the linearization points, where F>0 and the maximum of F, $F_{MAX}$, is such that:

$$F_{MAX} < (i-1) \times \frac{C_u}{(n-1)} - \left[\sin\left(\frac{(i-1) \times 2 \times \pi}{(n-1)}\right) \times C_u\right]$$

$C_u$ is a useful travel of the sensor along the axis as a spatial angle;

Step 4: for each value of the arctangent function (tan(θ)), finding an index (i) of the linearization point such that:

$$\theta_i < \theta < \theta_{i+1}$$

where:
θ$_i$ is the position of the linearization point i as a spatial angle,
θ$_{i+1}$ is the position of the linearization point (i+1) as a spatial angle,
θ is a spatial angle;
Step 5: calculating a correction to be applied to the arctangent function (tan(θ)) according to the formula $$\text{Corr}(\tan(\theta)) = \varepsilon(\theta_i) + [\varepsilon(\theta_{i+1}) - \varepsilon(\theta_i)] \times \left[\frac{\tan(\theta) - \tan(\theta_i)}{\tan(\theta_{i+1}) - \tan(\theta_i)}\right]$$

where:
Corr(tan(θ)) is the correction on the arctangent function at the spatial angle θ,
ε(θ$_i$) is the error at the spatial angle θ$_i$,
ε(θ$_{i+1}$) is the error at the spatial angle θ$_{i+1}$,
tan(θ$_i$) is the value of the arctangent function at the spatial angle θ$_i$,
tan(θ$_{i+1}$) is the value of the arctangent function at the spatial angle θ$_{i+1}$,
tan(θ) is the value of the arctangent function at the spatial angle θ;
Step 6: calculating a corrected arctangent function (tan$_{corr}$(θ)):

$$\tan_{corr}(\theta) = \tan(\theta) + \text{Corr}(\tan(\theta))$$

where:
tan$_{corr}$(θ) is the corrected arctangent function,
tan(θ) is the arctangent function,
Corr(tan(θ)) is the correction on the arctangent function at the spatial angle θ; and
Step 7: determining the position (θ) of the target (T) along the axis (X) on the basis of the corrected arctangent function in accordance with (tan$_{corr}$(θ)), where (tan$_{corr}$(θ)) corrects for an imprecision of the position of the target (T) at opposite ends (E1, E2) of the useful travel, and thereby extend the useful travel (Cu) of the target (T).

2. The determination method as claimed in claim 1, wherein in step 2, the predetermined straight line (D$_L$) is a linear regression (y$_{DL}$) of the arctangent function (tan(θ)).

3. An inductive sensor (10) for sensing a position of a target (T) along an axis (X) of the sensor, comprising:
a primary winding (B1) generating an electromagnetic field;
a first secondary winding (R1), generating a first voltage signal (V1) of a sine function type, representing a current induced in said first secondary winding (R1) when the target (T) moves in front of the first secondary winding (R1);
a second secondary winding (R2), generating a second voltage signal (V2) of a cosine function type, representing a current induced in said second secondary winding (R2) when the target moves in front of the second secondary winding (R2); and
a calculation unit (20') in communication with the first and second secondary windings (R1, R2), and configured to receive the first voltage signal (V1) and the second voltage signal (V2) respectively from the first secondary winding (R1) and the second secondary winding (R2), and further to operate as
first means (M1) for calculating an arctangent function (tan(θ)) on the basis of the first voltage signal (V1) and the second voltage signal (V2);
second means (M2) for calculating an error (ε(θ)) between the calculated arctangent function (tan(θ)) and a predetermined straight line (D$_L$);
third means (M3) for calculating positions of linearization points (θ$_i$) of the arctangent function (tan(θ)) according to the formula $$\theta_i = (i-1) \times \frac{C_u}{(n-1)} - \left[\sin\left(\frac{(i-1) \times 2 \times \pi}{(n-1)}\right) \times F \times C_u\right]$$

where:
i is an index of the linearization points, varying from 1 to n,
(θ$_i$) is the position of the linearization point i as a spatial angle,
F is a spacing factor of the linearization points, where F>0 and the maximum of F, F$_{MAX}$, is such that:

$$F_{MAX} < (i-1) \times \frac{C_u}{(n-1)} - \left[\sin\left(\frac{(i-1) \times 2 \times \pi}{(n-1)}\right) \times C_u\right]$$

C$_u$ is a useful travel of the sensor along the axis as a spatial angle,
means (M$_R$) for finding an index (i) of the linearization point such that, for each value of the arctangent function:

$$\theta_i < \theta < \theta_{i+1}$$

where:
θ$_i$ is the position of the linearization point i as a spatial angle,
θ$_{i+1}$ is the position of the linearization point (i+1) as a spatial angle,
θ is a spatial angle;
fourth means (M4) for calculating a correction to be applied to the arctangent function according to the formula:

$$\text{Corr}(\tan(\theta)) = \varepsilon(i) + [\varepsilon(i+1) - \varepsilon(i)] \times \left[\frac{\tan(\theta) - \tan(i)}{\tan(i+1) - \tan(i)}\right]$$

where:
Corr(tan(θ)) is the correction on the arctangent function at the spatial angle θ,
ε(i) is the error at the linearization point i,
ε(i+1) is the error at the linearization point (i+1),
tan(i) is the value of the arctangent function at the point i,
tan(i+1) is the value of the arctangent function at the point (i+1),
tan(θ) is the value of the arctangent function at the spatial angle θ;
fifth means (M5) for calculating a corrected arctangent function:

$$\tan_{corr}(\theta) = \tan(\theta) + \text{Corr}(\tan(\theta))$$

where:
- $\tan_{corr}(\theta)$ is the corrected arctangent function,
- $\tan(\theta)$ is the arctangent function,
- $\mathrm{Corr}(\tan(\theta))$ is the correction on the arctangent function at the spatial angle $\theta$; and means ($M_D$) for determining the position ($\theta$) of the target (T) along the axis (X) on the basis of the corrected arctangent function ($\tan_{corr}(\theta)$), where ($\tan_{corr}(\theta)$) corrects for an imprecision of the position of the target (T) at opposite ends (E1, E2) of the travel, and thereby extend the useful travel (Cu) of the target (T).

4. A motor vehicle, comprising an inductive sensor (10) as claimed in claim 3.

* * * * *